United States Patent [19]

Pawkett

[11] Patent Number: 5,284,323

[45] Date of Patent: Feb. 8, 1994

[54] APPARATUS FOR MARINE SEISMIC CABLE RETRIEVAL AND DEPLOYMENT

[76] Inventor: James P. Pawkett, P.O. Box 313, Sheridan, Tex. 77475

[21] Appl. No.: 831,893

[22] Filed: Feb. 6, 1992

[51] Int. Cl.[5] ........................................... B65H 54/00
[52] U.S. Cl. ........................................... 254/134.3 SC
[58] Field of Search .............. 254/134.3 SC, 134.3 R, 254/134.3 PA, 134.3 FT; 242/158 R, 158.4 R, 155 BW

[56] References Cited

U.S. PATENT DOCUMENTS

| | | | |
|---|---|---|---|
| 2,659,549 | 11/1953 | Galin | 254/134.3 SC |
| 2,948,483 | 8/1960 | Petersen | 242/155 BW |
| 3,143,309 | 8/1964 | Clarke | 254/134.3 SC |
| 3,719,348 | 3/1973 | Wells | 254/134.3 SC |
| 3,934,854 | 1/1976 | Goode | 254/134.3 R |
| 4,721,285 | 1/1988 | McMichael | 254/134.3 SC |

Primary Examiner—Robert C. Watson
Attorney, Agent, or Firm—Pravel, Hewitt, Kimball & Krieger

[57] ABSTRACT

Apparatus for use in deploying and retrieving marine seismic cable while a vessel maintains a nominal forward speed, including a secondary reel located aft of the cable main reel wherein the streamer is wrapped at least twice around the secondary reel in a manner to avoid overlap.

2 Claims, 4 Drawing Sheets

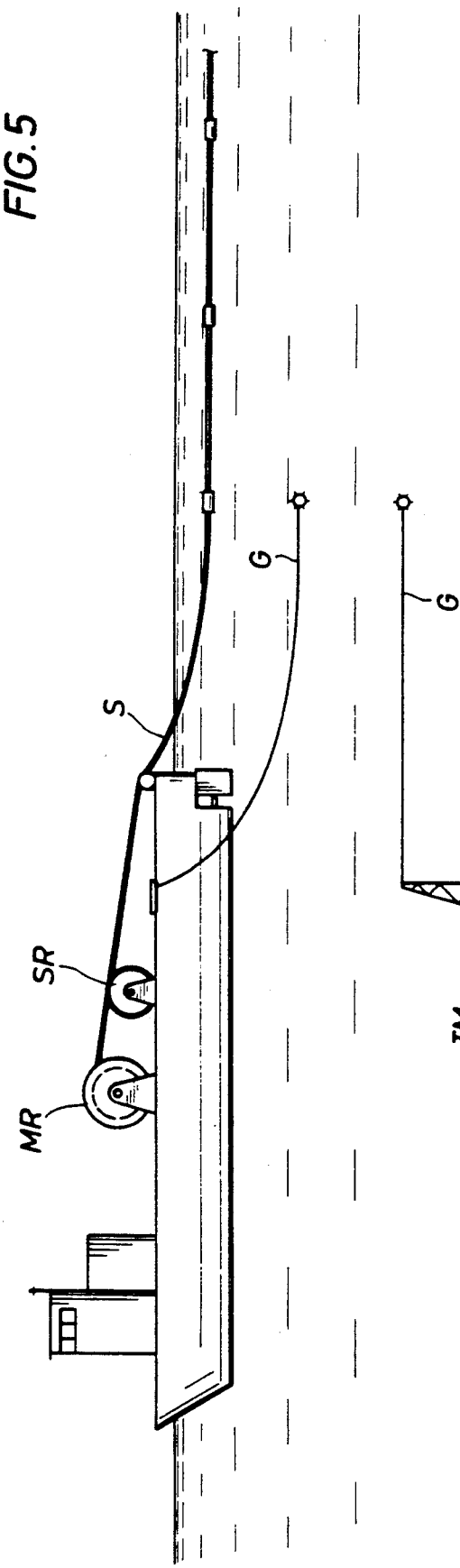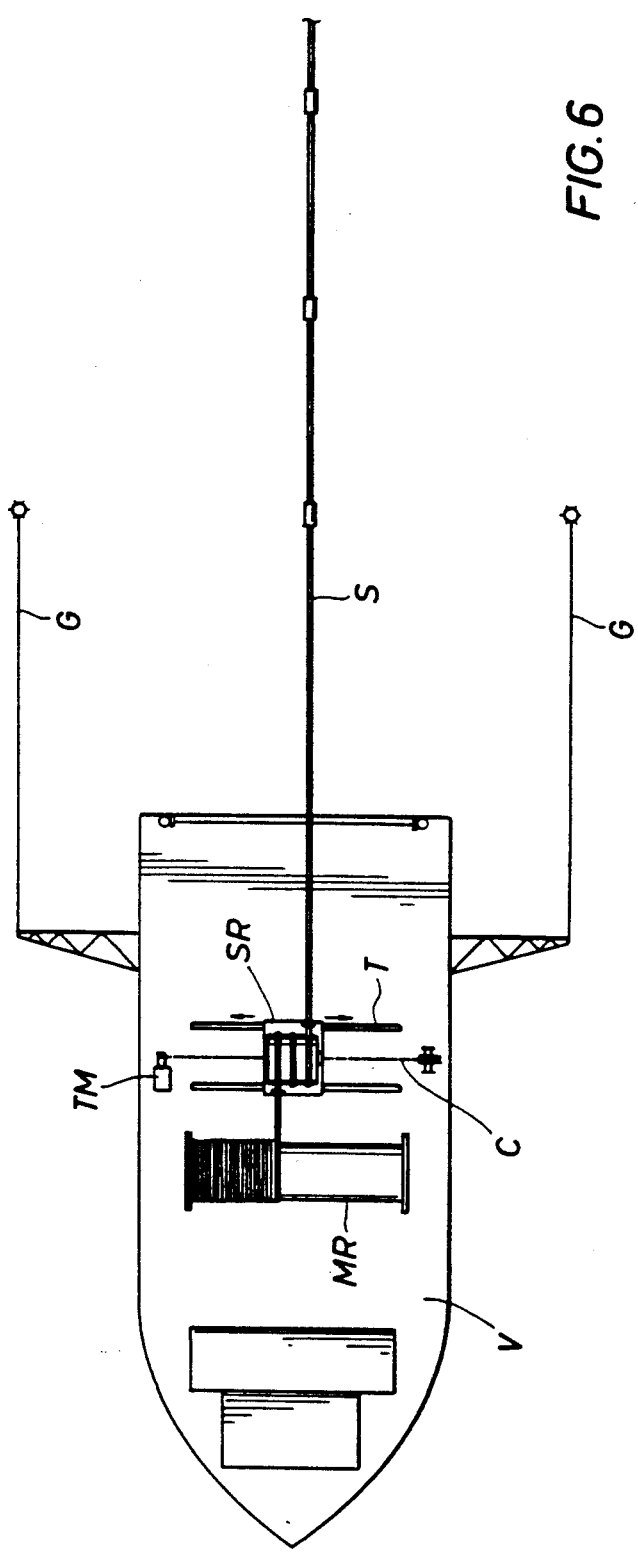

APPARATUS FOR MARINE SEISMIC CABLE RETRIEVAL AND DEPLOYMENT

FIELD OF THE INVENTION

This invention relates to method and apparatus for retrieving and deploying a marine seismic cable and more particularly, to method and apparatus for retrieving seismic cable while the vessel maintains a nominal forward motion.

BACKGROUND OF THE INVENTION

Since the marine seismic industry has progressed to towing multi-equipment, including two or more streamers, from one vessel, there has been a substantial increase in the operational down time whenever it is necessary to make repairs to a single streamer. Retrieving only a single streamer from among a plurality of towed equipment requires that the vessel maintain a nominal forward motion throughout. Utilizing present methods and apparatus, reeling in a single streamer while the vessel maintains a nominal forward motion results too frequently in damage to the streamer, i.e., holes, pinched wires and crushed bulkheads. Thus, the present industry norm dictates that the vessel be backed up while retrieving a streamer. This requires that all towed equipment be picked up, substantially increasing the effort and operational down time.

Streamers are complex cables usually comprised of a fluid filled jacket having a diameter of three or more inches. Some of the newer cables utilizing fiber optics may have diameters closer to two inches. There are various and numerous types and builders of seismic cables with associated varieties of includable equipment and means for their attachment. Generalizing with respect to this variety, cables are typically comprised of multiple electric lines, steel stress members, bulkheads, interconnects, hydrophones, program plugs, bird collars, and other equipment, predominantly encased in a polyurathene or PVC jacket. The typical jacket wall thickness is about ⅛ of an inch Streamer lengths typically run between 2000 to 5000 yards. Each length is comprised of multiple sections. A section may run approximately 50 yards. Sections are connected by rigid connectors, several inches in length. Some connectors may exceed a foot in length. The connectors are held to the jacket by attachment means such as punch lock bands. Sections frequently contain, coupled within their length, other equipment, such as program plugs or bird collars. The plugs are comprised of rigid cylinders approximately twelve to fifteen inches long and are fixed within the jacket by attachment means such as punch lock bands. Bird collars are usually screwed around the circumference of the jacket, intermediate the sections.

A seismic cable must be handled with care. The length of the housing for certain of the included equipment dictates that the cable not be wound upon a drum with a curvature too great to accommodate certain straight cylindrical portions. The punch lock band attachment means, as well as the connectors themselves, the bulkheads, program plug housings and other included equipment, offer sharp corners, edges or points. They can penetrate or tear the jacket if inappropriately handled or juxtaposed under pressure. The cable, as mentioned above, is filled with a fluid for pressure purposes, for ballast and to satisfy other equipment needs such as that of the hydrophones. Holes in the jacket require that the jacket be repaired or replaced.

A seismic cable retrieved while the vessel maintains a nominal forward speed will be retrieved under significant tension The tension is such that layers of the streamer, when successively wrapped around a main cable reel, may frequently manage to puncture the jacket, pinch wires or crush bulkheads and equipment on the underlying layers. It is because of this potential for harm to the cable when wrapped under tension that the present industry norm dictates that seismic cables be retrieved while slowly backing the vessel through the water.

It is an object of the present invention to provide a method and apparatus for retrieving marine seismic cables wherein a single cable can be safely retrieved while the vessel maintains a nominal forward motion. Maintenance of nominal forward motion obviates the need to retrieve all towed equipment, thereby saving work and operational down time.

It is a further object of the invention to provide a feedback indication of the tension under which the cable is being retrieved. If the tension exceeds a threshold level, the reeling process can be slowed or stopped and/or the vessel's rate of forward motion can be decreased.

It is further object of the invention for the retrieval apparatus to function to facilitate a level wind for the main reel.

SUMMARY OF THE INVENTION

The present method for retrieving marine seismic cable can be appreciated by contrasting it with the present industry norm. For a typical configuration, a vessel tows three streamers together with a set of gun lines off its port and starboard side According to the present art, the vessel is first slowed to a nominal speed. The gun lines on each side of the vessel are reeled in, one side at a time. The booms holding the port and starboard streamers are swung in, one side at a time. The cable is disconnected from the boom. The vessel is then slowly backed up while all main reels are rotated to retrieve all three cables.

According to the present invention, at most one set of gun lines needs to be reeled in. At most, one boom needs to be swung in and the cable disconnected from the boom and outrigging. By manner of wrapping at least two turns of cable around a secondary reel designed for the purpose, and rotating the secondary reel in conjunction with the main reel, one streamer, either port or starboard or center aft, may be reeled in while the vessel continues to maintain its nominal forward speed. At least one set of gun lines and the two other streamers remain deployed.

As an additional feature, a pressure sensing element is placed between the secondary reel and a mechanism upon which it rests. The element senses motion in a direction lying in a plane perpendicular to the reel axis. The element is calibrated to generate a readout to alert the vessel or crew if the tension placed on the streamer during retrieval exceeds a threshold level. This allows the vessel or crew to take precautionary measures, such as to stop reeling or to slow the vessel.

The retrieved streamer is wrapped from the secondary reel to the main reel at a slack tension, even though the vessel is maintaining nominal forward speed, since the main reel can be regulated to pick up cable from the secondary reel at a slack tension. The streamer portions turned around the secondary reel at any one time are the only portions under radial compression. The location of these portions wrapped around the secondary reel is managed by cable guides such that the portions do not overlap. The cable, thus, avoids damaging itself through overlapping radial compression. Padding or a resilient surface on the secondary reel drum further helps avoid damage to the streamer and its components that might be occasioned by the compression against the secondary reel drum caused by the tension in the line. The padding also increases the friction for maintaining the grip of the cable against the surface of the secondary drum.

As the cable is being retrieved, provision is made for the secondary reel to traverse the width of the main reel, thereby facilitating a level wind of the cable on the main reel.

The diameter of the secondary drum is chosen large enough to prevent damage to the cable by sharp turns or bends. It is selected to be small enough to provide a manageable apparatus with sufficient grip of the cable on the drum surface.

BRIEF DESCRIPTION OF THE FIGURES

FIG. 5 illustrates a side view of the vessel with main reel and secondary reel.

FIG. 6 illustrates a top view of FIG. 5.

DESCRIPTION OF THE PREFERRED EMBODIMENTS

In a modern vessel for performing seismic surveys large booms and outrigging are used to deploy multiple streamers and gun lines. There exists upper and lower deck from which seismic cables may be deployed.

Typical seismic cable is stored around storage reels. Multiple bulkheads are involved in the cable. Typical portions of seismic cable have connective joints as well as wires and protective cover or jacket associated with such cable. The cable may include, interconnects and a punch lock band attaching the jacket to one portion of the interconnect.

Figure 1:
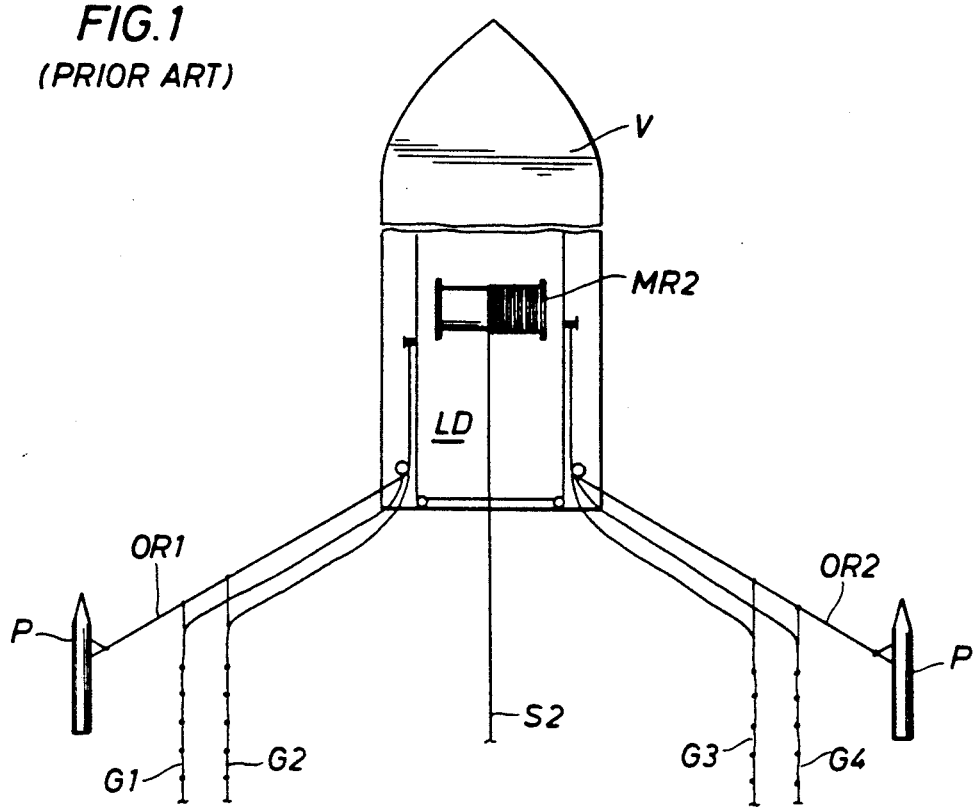
FIGS. 1 and 2, illustrate the prior art method and apparatus for retrieving seismic cable.
Figure 2:
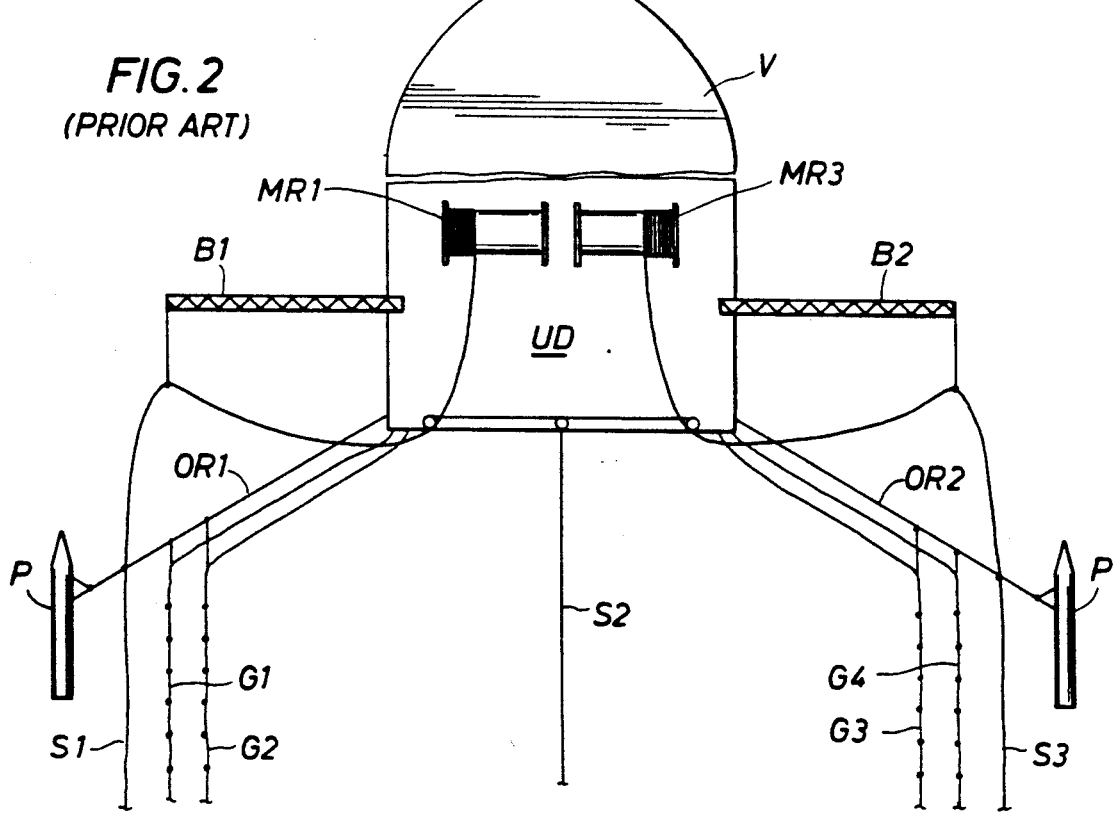

FIGS. 1 and 2 comprise, according to the method and apparatus of the prior art, a schematic of a vessel V showing upper deck UD and lower deck LD. FIG. 1 illustrates seismic cable or streamer S2 deployed central aft from main reel MR2 off of vessel V lower deck LD. The figure illustrates outrigging arms OR1 and OR2 to the port and starboard of the vessel and attached to paravanes P. Gun lines G1, G2, G3 and G4 are deployed from outrigger arms OR1 and OR2. FIG. 2 illustrates the deployment of seismic cable streamers S1 and S3 to the port and the starboard of vessel V. S1 is deployed from main reel MR1. Streamer S3 is deployed from main reel MR3. Main reels MR1 and MR3 are located on the upper deck UD of vessel V. Booms B1 and B2 assist in the deployment of streamers S1 and S3 to the port and starboard side of vessel V.

Figure 3:
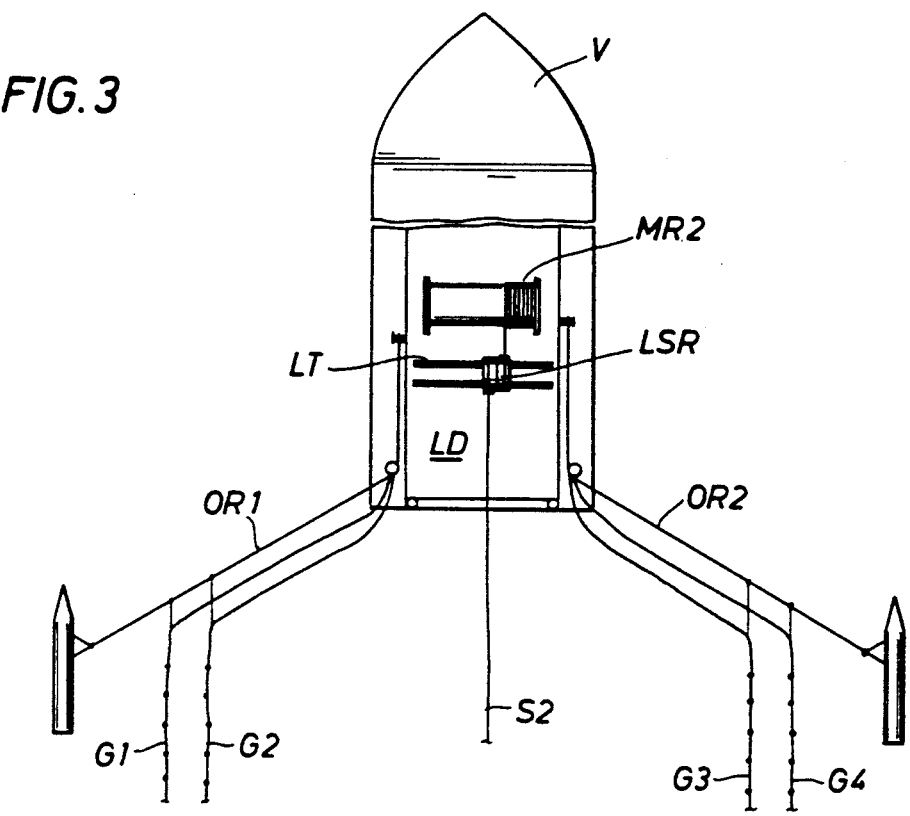
FIGS. 3 and 4 illustrate, in comparison to FIGS. 5 and 6, the method and apparatus of the present invention for retrieving seismic cable.
Figure 4:
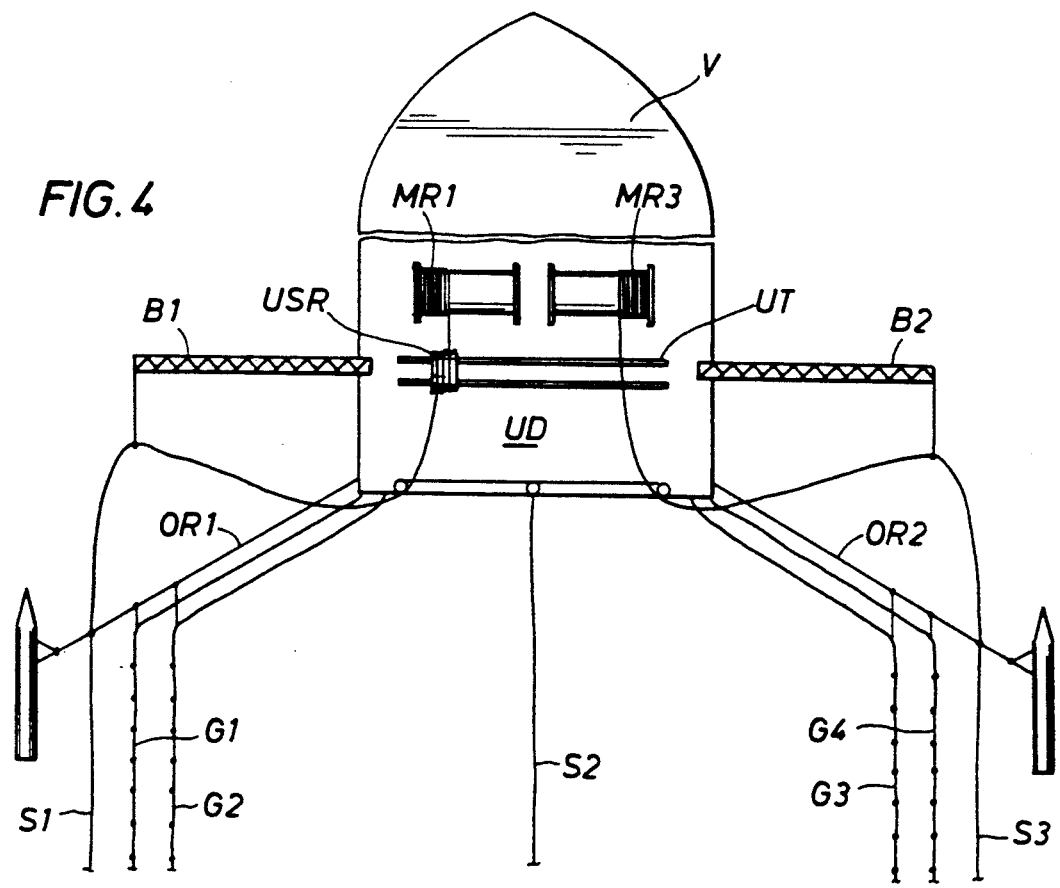
Figure 7:
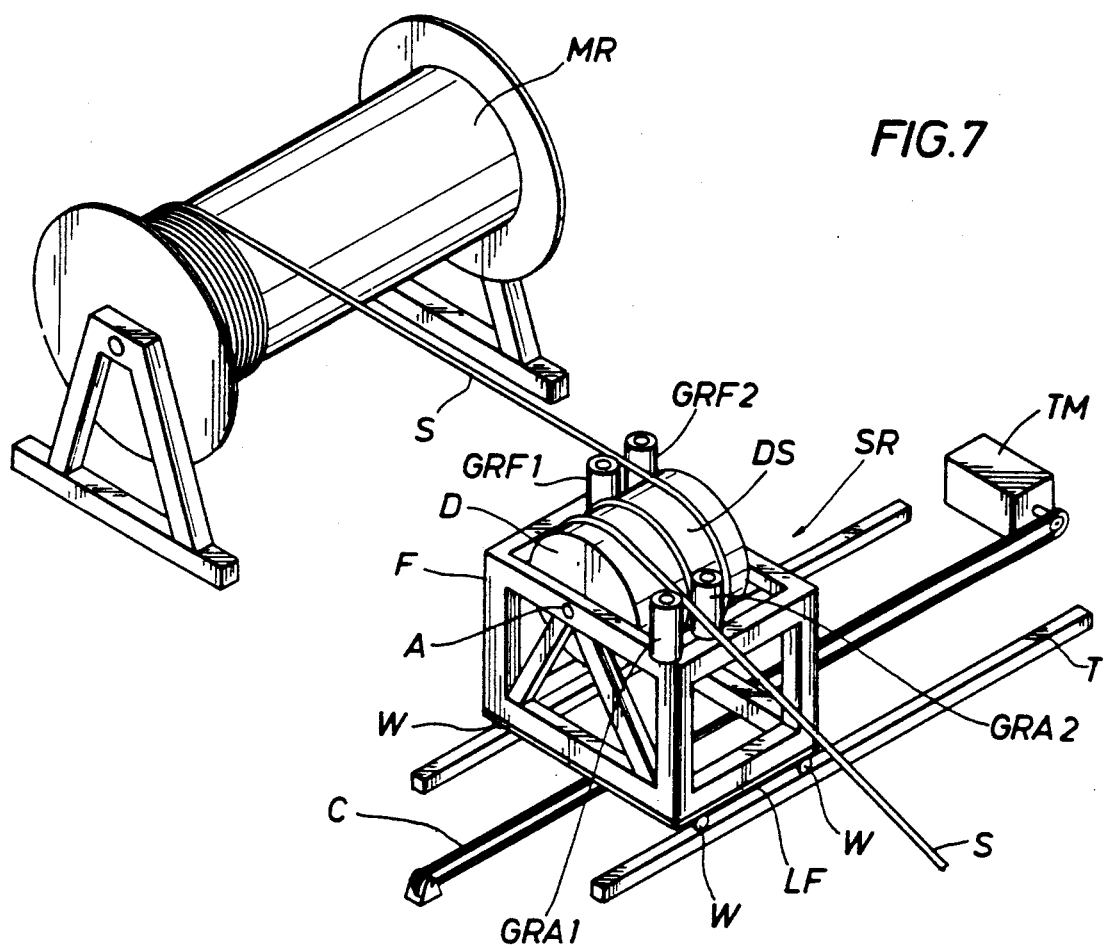
FIG. 7 illustrates the secondary reel system.

FIGS. 3 and 4 illustrate the same vessel V of FIGS. 7 and 2, except with the present invention. FIG. 3 illustrates the location of secondary reel LSR, aft of main reel MR2, on the lower deck LD of vessel V. Streamer S2 is shown deployed from main reel MR2 by means of secondary reel LSR. Secondary reel LSR is shown movably attached to, and capable of traversing, lower track LT affixed to the lower deck LD of vessel V. FIG. 4 illustrates upper deck UD of vessel V. Upper secondary reel USR is shown involved in the deployment of streamer S1 to the port of vessel V. FIG. 4 illustrates the use of only one secondary reel USR for both main reels MR1 and MR3. Alternately, a separate secondary reel could be provided for each main reel. Upper secondary reel USR is shown movably attached to, and capable of traversing the width of, main reels MR1 and MR3 by virtue of upper track UT. In the case illustrated in FIG. 4, the traversing means would permit upper secondary reel USR to traverse half of upper track UT, either the port side or the starboard side, for any one operation.

FIG. 5 offers an illustrative side view of the relative location of main reel MR and secondary reel SR located aft of the main reel on the vessel, the main reel and secondary reel connected to streamer S. The diameter of the main reel drum ranges typically from seven to eight feet. The diameter of the secondary reel of the preferred embodiment runs approximately six feet. Gun line G is shown deployed from the port of the vessel.

FIG. 6 offers a top view of the illustration of FIG. 5 showing secondary reel SR aiding in the retrieval or deployment of streamer S from main reel MR. Gun lines G are shown deployed to the port and starboard of vessel V. Secondary reel SR is illustrated movably attached to and capable of traversing track T. Traversing motor TM and chain C provide one means known to those skilled in the art to effect the traversal of secondary reel SR over track T. Traversing motor TM causes chain C to rotate over a course along the length of track T. Secondary reel SR rides on a lower frame LF (not shown) mounted on wheels that engage track T. Lower frame FR is connected to an element of chain C such that as chain C circles, secondary reel SR is carried to the left and to the right by means of the rolling of the lower frame wheels over track T.

Other equivalent means for effecting the traversal of a secondary reel SR over a track T will be well known and recognized by those skilled in the art. For instance, a rod with left and right spiral grooves could be caused to rotate. The lower frame could be attached to an element that rides within the grooves of the rod such that when the rod is rotated, the element causes the secondary reel to be urged to the left or to the right.

FIG. 7 illustrates a secondary reel in more detail. Secondary reel SR turns an axis A that rests on frame F. Frame F is attached to lower frame LF that rides upon wheels W that traverse track T. Streamer S, emerging from the water, is wrapped twice around drum D of secondary reel SR. From the secondary reel, streamer S moves forward and is wrapped at a slack tension around main reel MR. Aft guide rollers GRA1 and GRA2 act as cable guides and guide the entrance of streamer S on to drum D from the water. Forward guide rollers GRF1 and GRF2 guide the exiting streamer S from drum D to main reel MR. The guide rollers act as cable guides to help ensure that streamer S does not overlap itself on drum D. Traversing motor TM is shown with its chain C. Not shown is a means of attachment of lower frame LF, under secondary reel SR, to an element of chain C such that as chain C rotates around its pulleys, the element carries the secondary reel to the left and to the right.

Figure 8:
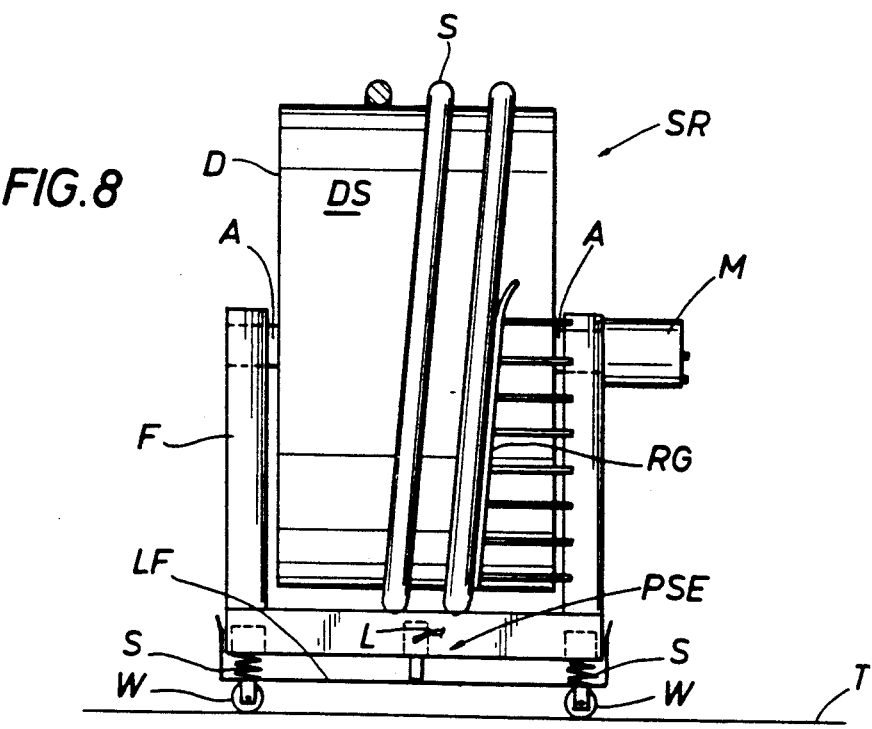
FIG. 8 illustrates an aft view of the secondary reel.

FIG. 8 illustrates a view of secondary reel SR from the aft looking forward Additional rail guide RG is illustrated as attached to the aft right portion of frame F. Rail guide RG assists streamer S in maintaining a regular non-overlapping position while wrapped around drum D. A similar rail guide could be attached to the forward portion of frame F. Illustrated in FIG. 8 is motor M that provides the power to turn axle A and cause the rotation of drum D. As is known in the art, motor M may be a hydraulic motor. FIG. 8 illustrates frame F attached by springs S, at least in the aft section, to lower frame LF. Wheels W are attached to lower frame LF and ride upon track T. Located intermediate frame F and lower frame LF is pressure sensitive element PSE. PSE might be a dynamometer. PSE detects movement of frame F up and down with respect to lower frame LF, in a direction perpendicular to the axis of the reel. That direction lies in a plane, perpendicular to the plane of the paper of FIG. 8. Such movement is an indicator of the tension being placed upon streamer S as the top of drum D is rotated away from the viewer to retrieve streamer S from the water. Line L connects the readout of pressure sensitive element PSE to any calibrated readout device in order to alert the vessel and/or crew to a measure of the tension being placed upon streamer S as it is being retrieved.

In operation, in order to retrieve central aft streamer S2, neither outrigging arm OR1 nor OR2 need be moved. If either streamer S1 or S3 deployed to the port or starboard of the vessel needs to be retrieved, then the boom and outrigging on that side of the vessel should be swung in and the set of guns on that side of the vessel retrieved. The streamer should be disconnected from the outrigging. Motor M of the appropriate secondary reel SR is commenced to drive drum D of the secondary reel in the direction to retrieve streamer S. Vessel V maintains a nominal forward motion in order to maintain the orderly deployment of the other gun lines and streamers. At least two turns of the streamer have been taken around the drum of the secondary reel. The streamer is guided on to the drum of the secondary reel by means of aft guide rollers. The streamer is guided from the drum of the secondary reel by means of forward guide rollers. The motor associated with the appropriate streamer main reel is also activated and maintains a rotational speed necessary to wrap the streamer around the main reel at a slack tension. The control of the speed of rotation of the main reel can be managed by automatic or human control, as is known in the art. As the secondary reel retrieves the streamer in one preferred embodiment, traversing motor TM slowly causes the secondary reel to traverse to the right and the left over track T. In such manner a level wind of the streamer is facilitated on its main reel MR. Pressure sensitive element PSE affords a read-out of a function of the tension to which streamer S is being subjected during retrieval. If the read-out exceeds a threshold level, the speed of reeling may be slackened and/or the speed of the vessel forward may be slowed.

As shown in FIG. 7, the surface of drum D is preferably resilient or comprised of padded material DS. Padded material or a resilient surface DS help to ensure that the streamer portion placed under tension as it is wrapped around secondary reel SR is not damaged, pinched or crushed through radial pressure If rail guides RG are attached to the fore and/or aft of frame F of the secondary reel, they will assist in maintaining the location of streamer S on drum surface DS.

As would be recognized by those skilled in the art, the streamer may be deployed as well as retrieved by means of the secondary reel located aft of the streamer's main reel. Thus, the streamer need not be unnecessarily unwrapped from the secondary reel.

The foregoing disclosure and description of the invention are illustrative and explanatory thereof. Various changes in the size, shape and materials as well as the details of the illustrated construction may be made without departing from the spirit of the invention.

I claim:

1. Apparatus for use in deploying and retrieving marine seismic cable, comprising
a secondary reel located aft of a cable main reel, movably attached to a track that traverses the width of the main reel, the secondary reel having a drum of a diameter between approximately fifty percent and one hundred percent of the diameter of the main reel drum and having aft and forward cable guides, each located at a fixed position with respect to the surface of the drum to fix the position at which the cable is taken upon and fed from the drum and wherein the secondary reel is flexibly attached to a wheel mechanism that is movably attached to the track.

2. The apparatus of claim 1 wherein a pressure sensitive element is located intermediate the secondary reel and the wheel mechanism.

* * * * *